A. KLEIN.
MILKING MACHINE.
APPLICATION FILED DEC. 3, 1913.
1,109,994.
Patented Sept. 8, 1914.
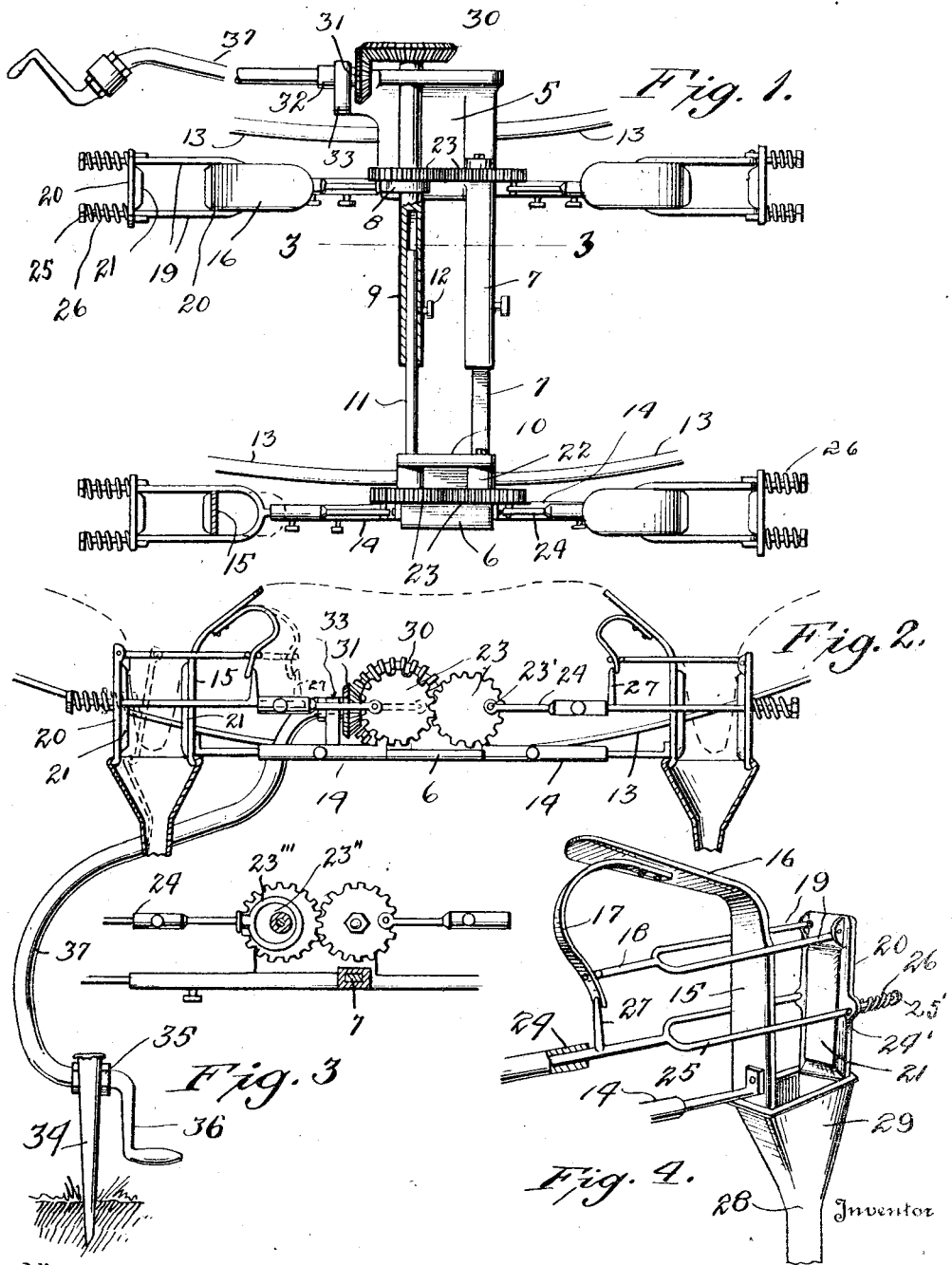
Inventor
A. Klein.

UNITED STATES PATENT OFFICE.

ALBERT KLEIN, OF CODY, WYOMING.

MILKING-MACHINE.

1,109,994. Specification of Letters Patent. Patented Sept. 8, 1914.

Application filed December 3, 1913. Serial No. 804,429.

*To all whom it may concern:*

Be it known that I, ALBERT KLEIN, a citizen of the United States, residing at Cody, in the county of Park, State of Wyoming, have invented certain new and useful Improvements in Milking-Machines; and I do hereby declare the following to be a full, clear, and exact description of the invention, such as will enable others skilled in the art to which it appertains to make and use the same.

This invention relates to new and useful improvements in devices for simultaneously engaging a plurality of the teats of a cow and milking the same.

The object of the present invention resides in the provision of a milking machine which may be readily attached to the teats of a cow and held in such position whereby the cow may be quickly milked without being subjected to any injury or to any annoyance which might cause a voluntary retention of the milk.

A further object of the invention resides in the provision of a milking machine of the class described which may be readily and efficiently operated and which comprises comparatively a minimum number of parts and may be manufactured at a comparatively low cost.

With these and other objects in view the invention resides in the novel combination, formation, and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a top plan view of the machine, Fig. 2 is a side elevational view thereof, with the cow's udder and teats shown in dotted outline, Fig. 3 is a sectional view on the line 3—3 of Fig. 1, and Fig. 4 is a perspective view of one of the teat engaging members.

Referring now more particularly to the accompanying drawings, the body portion of the device is shown as comprising base members 5 and 6, which are adjustably held in spaced relation by an extensible bar comprising the telescoping sections 7 adjustably held against relative movement. The base member 5 is provided with a vertical flange portion 8 in which is journaled the end of a shaft 9 disposed in spaced parallel relation. The end member 6 is provided with a vertical flange 10 in which is similarly journaled a shaft 11 which is telescopically disposed in a hollow portion of the free end of the shaft 9, a thumb-screw 12 being carried by the shaft 9 to lock it in relation with the shaft 11. Thus adjustable means are provided for transmitting power from one base member to the other. Secured to the end members are suitable straps 13 which are passed around the body of the cow to hold the body portion of the milking machine in position under the udder.

The teat engaging portions of the machine include extensible arm portions 14 rigidly secured to and extending laterally from each of the base members. To the free end of each arm 14 is rigidly secured a vertical plate 15 having its upper end inwardly curved at 16 to correspond with the curve of the udder. A leaf spring 17 depends from the free end portion of each plate 15 and has pivotally secured thereto a rod 18 carrying the fork 19 which straddles the vertical plate and has the free ends of its arms pivotally secured to the upper end of a teat pressing plate 20. The teat is adapted to be disposed between the plates 15 and 20 and compressed therebetween upon movement on the latter plates inwardly, the teats being protected by suitable cushions 21 on the inner faces of the plates.

To reciprocate the plates 20 upon movement of the shafts, stub shafts 22 are journaled in the flange portions 8 and 10 and are driven by the shafts 9 and 11 through the medium of intermeshing gears 23 and extending outwardly from all of the gear wheels except the one carried by the shaft 9, from points adjacent their peripheries are pins 23', to which are pivotally secured extensible rods 24 each terminating in a yoke 25 straddling a pair of plates 15 and 20 and pivotally passed through lugs 24' on the latter plate. The free ends of the yoke terminate in heads 25' and expansile springs 26 are coiled on the fork between the lugs 24 and heads 25'. As the shaft 9 is necessarily extended on each side of its gear wheel 23, in lieu of the pin 23', a cam 23'' is provided on said wheel and the usual rod 24 is secured thereto by a strap 23'''. The leaf springs 17 are extended below the rods 18 and the rods 24 carry adjacent thereto upstanding lugs 27.

The operation of each teat engaging member is as follows: The spring 17 normally through the medium f the rod 18 holds the upper end of the plate inwardly to clamp the neck of the teat to prevent milk flowing therethrough. When the rod 24 is pushed outwardly, the lug 27 engages the bottom portion of the spring and thus forces the top portion of the plate 20 outwardly. When the rod 24 has reached its outward limit of movement, the spring 17 slips over the top of the lug and springs back to its normal position to clamp the teat. As the rod 24 is drawn backwardly it thus draws the lower portion of the plate 20 inwardly to press the milk outwardly of the teat. As the rod 24 reaches its inward limit of motion, this lug passes under the end of the spring and thus moves into position to engage the spring and force it outwardly as above described to release the clamping engagement of the teat and thus continue the milking operation. The milk is conveyed to a suitable receptacle through tubes 28 having at their upper ends flared mouths 29 secured to the lower ends of the vertical plates 15.

For imparting energy to the machine, the shaft 9 is extended and has secured to said extended end a gear wheel 30 meshing with a gear wheel 31 carried by a stub shaft 32 journaled in an upstanding lug 33 on the base member 5. A stake 34 or other suitable support is provided and has a stub shaft 35 journally carried thereby and terminating in a crank arm 36. A flexible power shaft 37 connects the stub shafts 32 and 35. It will be of course understood that any other suitable power mechanism may be provided and that various other changes and modifications within the scope of the appended claims may be made without in any manner departing from the spirit of the invention.

It is seen from the foregoing description that a very simple and efficient machine has been provided which may be readily operated without injuring the cow.

What is claimed is:

1. A milking machine comprising a base portion, a shaft journaled on said base portion, journaled stub shafts adjacent each end of the first shaft having geared connection therewith, teat engaging members extending from the base portion and each comprising a stationary and a reciprocable member and connections between the reciprocable members and the shafts for actuating said members upon rotation of the shafts.

2. A milking machine comprising base members, an extensible bar connecting said members, a shaft comprising two sections having their adjacent ends adjustably connected and each journaled on a base member, stub shafts journaled on the base members, intermeshing gear wheels between the stub shafts and the main shafts, teat engaging members held in adjustable spaced relation to the base members, said teat engaging members including reciprocable elements and extensible rods engaging said elements and having connections with the said gear wheels whereby rotation thereof will reciprocate the rods.

3. In a milking machine, a teat engaging member comprising a supporting element, a stationary vertical plate secured thereto, a second plate reciprocable with relation to the first plate and pivotally mounted intermediate of its ends, means for moving the upper portions of the second plate inwardly, means for resiliently urging the lower portion of the plate inwardly and means tending to resiliently urge the second plates outwardly.

4. In a milking machine, a teat engaging member comprising a supporting element, a stationary vertical plate secured thereto and having its upper portion inwardly directed, a leaf spring depending from said upper portion, a reciprocable plate, a member pivotally connected to the upper end of the reciprocable plate and to the lower portion of the leaf spring, a reciprocable actuating bar terminating in a yoke straddling the vertical bar and slidably passed through the intermediate side portions of the reciprocable bar, heads at the free ends of said yoke and springs disposed between said heads and the reciprocable plate.

In testimony whereof, I affix my signature, in the presence of two witnesses.

ALBERT KLEIN.

Witnesses:
C. L. BRADY,
H. BOTCH.